Feb. 21, 1939.   F. E. SHOPEN   2,147,861
PIVOTALLY MOUNTED SOAP TRAY
Filed Jan. 7, 1937
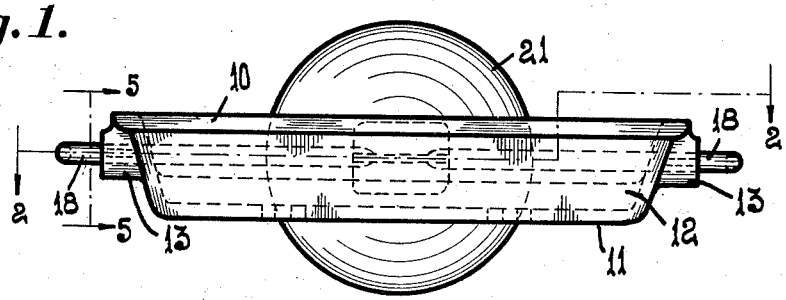
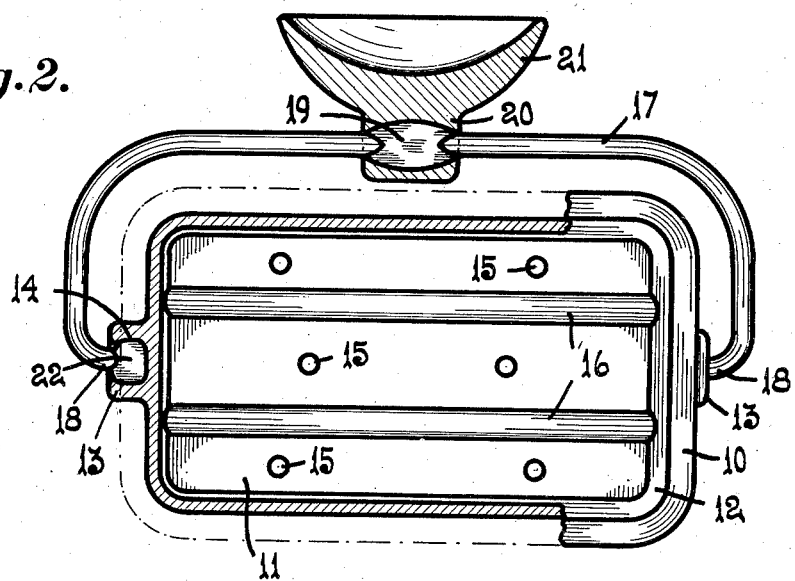
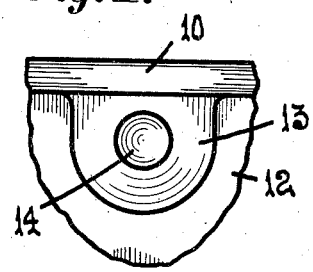
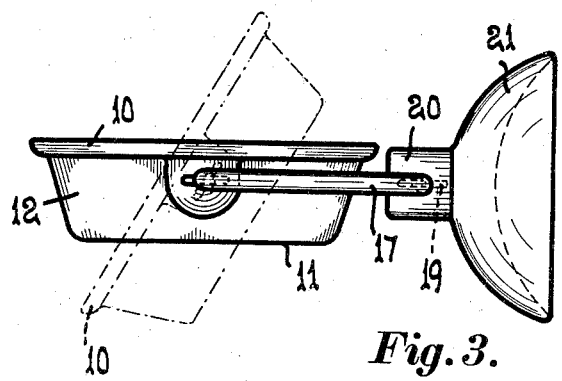
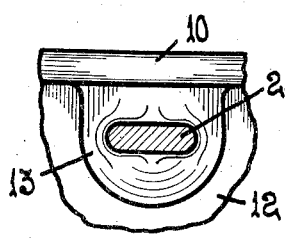
Inventor
F. E. Shopen
By Arthur H. Sturges
Attorney Patented Feb. 21, 1939

2,147,861

UNITED STATES PATENT OFFICE 2,147,861

PIVOTALLY MOUNTED SOAP TRAY

Frank E. Shopen, Omaha, Nebr.

Application January 7, 1937, Serial No. 119,416

2 Claims. (Cl. 248—204)

This invention relates to lavatory devices and more particularly to soap dishes or the like receptacles.

It is an object of the invention to provide means whereby a soap dish may be selectively attached in a position of use to either a vertical or horizontally disposed surface such as the side wall of a bath tub, vertical dash-board wall of a wash bowl or the horizontal surface of the latter in a manner whereby the dish or receptacle may be turned with respect to its support to a horizontal position or other desired position of use.

A further object of the invention is to provide means for releasably detaining the dish or receptacle in a selected position with respect to its support.

Other and further objects and advantages of the invention will be understood from the following detailed description thereof reference being had to the accompanying drawing in which:

Figure 1 is a side elevation of the device in a position of use as attached to a vertical wall or vertical surface of an object.

Figure 2 is a top plan view of the device shown in Figure 1, certain portions thereof being in section, the latter being taken substantially on line 2—2 of Figure 1.

Figure 3 is an end elevation of the device shown in Figure 1.

Figure 4 is a fragmentary view of an end of the receptacle and showing the normal form of a resilient hub or bearing employed.

Figure 5 is a view similar to Figure 4 and showing said bearing in a stretched or deformed condition of use.

Referring now to the drawing for a more particular description, 10 indicates generally a soap dish or a like receptacle which preferably is formed entirely of rubber or may be formed of suitable metal, wires or the like which in all modifications are provided with a later mentioned resilient axle bearing.

The dish includes a base 11 having a perimetrical rim flange 12 upstanding from the base and preferably extended entirely around the base. At opposite ends of the dish or receptacle a pair of hubs 13 are provided which are preferably in axial alignment with respect to each other. The hubs 13 are provided with recesses 14, the walls of which are formed of resilient material for purposes later described. Said hubs may comprise resilient washers secured to said dish or receptacle or in the event that the dish is formed entirely of rubber said hubs may be moulded integral therewith as shown in Figure 2.

The base 11 is provided with a plurality of apertures 15 at times when the receptacle is not formed of a foraminous sheet material whereby liquids may drain through said apertures away from a cake of soap supported thereby for permitting the soap to dry. The receptacle may further include longitudinally disposed ribs 16 upon which a cake of soap is adapted to be supported for holding the soap away from the base 11 for facilitating a rapid drying of the cake of soap.

A support 17 of substantially C-shape in plan is provided for the dish, said support having oppositely disposed inturned stub-axles 18 which are received in said recesses whereby the dish is adapted to have turning movements on its axles for disposing the dish in a selected position with respect to said support, the distance from said axles to the main body portion of said support being slightly greater than one-half of the width of the dish whereby the latter may be rotated on its axles without interference from said main body portion.

Substantially mid-way between the ends of the support 17 the latter is provided with a flattened portion 19 which is embedded in the shank 20 of a rubber vacuum cup 21 during the moulding of said cup.

The stub-axles are provided with deformed portions 22.

The normal contour of the walls of the recesses 14 is illustrated in Figure 4 and it will be understood that at times when the deformed axles are inserted into said recesses that they thereby provide detents cooperatively associated with said walls since the transverse area or width of said detents is greater than the normal width of the recesses 14 whereby the walls of the recesses or hubs 13 become stretched by said deformations and cooperatingly contract correspondingly about said detents for removably mounting said dish in a selected position with respect to said support or vacuum cup.

In operation the vacuum cup 21 is caused to adhere to a selective surface in a well known manner; whereupon the dish may be rotated to and maintained in a selected position.

Referring to Figure 3 and assuming that the vacuum cup 21 is secured to a vertically disposed surface the dish is preferably positioned at a right angle with respect to said surface or in the position shown in Figure 3 but may be moved and held if desired in the dotted line position thereof shown in Figure 3 for different purposes and it will be understood that at times when the vacuum cup 21 is attached to a horizontally disposed surface, the support then being disposed vertically, that the dish may be rotated to a horizontal position, if desired, and maintained in parallelism with said horizontal surface.

I do not wish to be restricted to the size, form and proportions of the various parts, and obviously changes could be made in the construction herein described without departing from the spirit of the invention, it being only necessary that such changes fall within the scope of the appended claims.

What is claimed is:—

1. In an article holding device comprising an article with end walls, oppositely disposed hubs formed of rubber carried by said end walls and being provided with recesses of circular contour, and a fixedly supported frame having oppositely disposed stub-axles terminating with elongated end portions of a width substantially greater than the diameter of the recesses whereby upon insertion of the elongated end portions of the stub axles into the circular recesses the walls of the recesses will be permanently distorted to a shape corresponding to the shape of said elongated end portions and the distorted walls will grip the outer surface of said elongated end portions to permit the article to be rotated and to be held in a selected position.

2. In an article holding device comprising an article provided with end walls, a pair of oppositely disposed hubs formed of rubber carried by said end walls, the said hubs being provided with recesses and spaced apart in axial alinement, and a fixedly supported frame with oppositely disposed stub-axles having flat surfaced end portions of a width substantially greater than the width of the recesses said flat surfaced end portions being inserted into said recesses, whereby the walls of the recesses are permanently distorted to a shape corresponding to the shape of said flat surfaced end portions and the distorted walls tightly grip the outer surface of said flat surfaced end portions to permit the article to be rotated and to be held in a selected position.

FRANK E. SHOPEN.